| United States Patent [19] | [11] 3,894,054 |
|---|---|
| Miya | [45] July 8, 1975 |

[54] PROCESS FOR PRODUCTION OF TETRAHYDROFURAN

[75] Inventor: Bunji Miya, Tokyo, Japan

[73] Assignee: Kao Soap Co., Ltd., Tokyo, Japan

[22] Filed: July 5, 1973

[21] Appl. No.: 376,724

[30] Foreign Application Priority Data
Sept. 18, 1972 Japan.............................. 47-93457

[52] U.S. Cl.......................................... 260/346.1 R
[51] Int. Cl................................................ C07d 5/02
[58] Field of Search .............................. 260/346.1 R

[56] References Cited
UNITED STATES PATENTS
2,130,501  9/1938  Latier .............................. 260/346.1
3,370,067  2/1968  Johnson .......................... 260/346.1

Primary Examiner—Norma S. Milestone
Assistant Examiner—Bernard I. Dentz
Attorney, Agent, or Firm—Woodhams, Blanchard and Flynn

[57] ABSTRACT

Tetrahydrofuran is produced by catalytically hydrogenating and dehydrating maleic anhydride at a temperature of 200°–300°C under a pressure of 10–50 kg/cm$^2$ in a molar ratio of hydrogen:maleic anhydride of from 10:1 to 200:1, characterized by conducting the reaction in the presence of a catalyst composition comprising a mixture of a catalyst obtained by calcining a silica-alumina catalyst having a silica:alumina molar ratio of 0.03–0.05:1 at 950°–1,150°C and a copper-chromium-zinc catalyst wherein the proportion of said copper containing catalyst in the mixture is 30–80 wt. %.

3 Claims, No Drawings

PROCESS FOR PRODUCTION OF TETRAHYDROFURAN

BACKGROUND OF THE INVENTION

1. Field of the Invention

The present invention relates to a process for the production of tetrahydrofuran by catalytically hydrogenating and dehydrating maleic anhydride in the gas phase in the presence of a copper containing catalyst and a dehydration catalyst.

A primary object of the invention is to provide a catalyst composition which can be prepared easily when it is used for industrial practice of the above reactions, and to provide a catalyst composition which can give very good results as regards the yield of tetrahydrofuran.

2. Description of the Prior Art

It has been well known that tetrahydrofuran is prepared by the catalytic hydrogenation and dehydration of maleic anhydride and that a copper containing catalyst or a catalyst mixture of a copper containing catalyst and a dehydration catalyst is used for the reaction. It has also been well known that relatively good results are obtained if a Cu-Cr-Zn catalyst is used as such copper containing catalyst and that alumina may be used as such dehydration catalyst. However, conventional processes for preparing tetrahydrofuran are all unsatisfactory due to insufficient yields. Among various publications wherein processes for preparing tetrahydrofuran are described, the highest yield is 96% (i.e., the product containing 4% impurities) and the truth of other reports wherein higher yields are reported is doubtful or the yields are lacking in reproducibility. Although the reported amount of impurities (less on calculation) contained in the product (crude tetrahydrofuran) is about 4%, an additional loss due to the impurities amounts to a considerable extent, because the product must be purified for removing the impurities. Therefore, the reduction in the amount of such impurities is very important in the industrial practice of the above process.

SUMMARY OF THE INVENTION

We have discovered a catalyst composition which give very excellent results in the industrial production of tetrahydrofuran by the catalytic hydrogenation and dehydration of maleic anhydride. That is, we have found that the impurities contained in the produced tetrahydrofuran can be remarkably reduced by employing a specific dehydration catalyst which has been subjected to a specific heat treatment. Although acid clay, molybdenum trioxide, silica-alumina, alumina, anhydrous nickel sulfate, etc., are considered to be usable as a dehydration catalyst in general, it has been found that a catalyst obtained by calcining a silica-alumina dehydration catalyst having a molar ratio of silica : alumina of 0.03–0.5: 1 at 950°–1,150°C exhibits an especially remarkable effect. It has also been found that the impurities contained in tetrahydrofuran can be reduced to less than 2% by using a combination of said silica-alumina catalyst with an optimum Cu-Cr-Zn catalyst in a certain proportion.

This invention provides a process for the production of tetrahydrofuran by catalytically hydrogenating and dehydrating maleic anhydride at a temperature of 200°–300°C under a pressure of 10–50 kg/cm$^2$ at a molar ratio of hydrogen : maleic anhydride of from 10 : 1 to 200 : 1, in which the reaction is carried out in the presence of a catalyst comprising a catalyst obtained by calcining a silica-alumina catalyst of a silica : alumina molar ratio of 0.03–0.5 : 1 at 950°–1,150°C and a copper-chromium-zinc catalyst wherein the proportion of said copper containing catalyst is 30–80 wt. % in the mixture.

The above mentioned optimum Cu-Cr-Zn catalyst is obtained by dissolving 1 mole of $CuSO_4$, 0.6–0.8 mole of $CrO_3$ and 0.3–0.5 mole of $ZnSO_4$ in an aqueous $Na_2CO_3$ solution, adding NaOH to the solution to effect precipitation, washing the precipitate with water and drying and calcining the precipitate. If the proportion of Cu, Cr and Zn is not within the above range, the effect of the obtained Cu-Cr-Zn catalyst will be reduced slightly and sometimes the amount of impurities in the produced tetrahydrofuran may not be kept less than 2%. However, excellent results can be obtained if such Cu-Cr-Zn catalyst is used together with the above specific dehydration catalyst according to the present invention. The suitable calcining temperature of the Cu-Cr-Zn catalyst is 400°–500°C, but, even if a higher calcining temperature is employed, no remarkable difference will be caused.

The proportion of the Cu-Cr-Zn catalyst to the silica-alumina catalyst should be so controlled that the Cu-Cr-Zn catalyst is contained in an amount of 30–80 wt. % in the mixture.

As for other reaction conditions, ordinary reaction conditions employed in the hydrogenation and dehydration of maleic anhydride may be employed. Namely, the reaction may be effected in a molar proportion of hydrogen : maleic anhydride of 10–200 : 1, under a pressure of 10–50 kg/cm$^2$, and at a temperature of 200°–300°C.

The mixing of the Cu-Cr-Zn catalyst and the silica-alumina catalyst may be effected of course by a mechanical means, but, if they are mixed together by using a binder, which is a gel solution comprising an aqueous $CrO_3$ solution added with oxalic acid, and the mixture is then calcined, the physical strength of the resulting catalyst is increased greatly and a trouble due to breakage of the catalyst in a prolonged continuous reaction can be prevented. Cr used as the binder has no substantial influence upon the catalyst activity.

The process of the present invention will now be further described in more detail by reference to the following illustrative examples.

EXAMPLE 1

229 g of $Na_2CO_3$ were dissolved in 2.1 liters of water. The solution was added with an aqueous solution of 623 g of $ZnSO_4 \cdot 7H_2O$ in 2.1 liters of water, an aqueous solution of 435 g of $CrO_3$ in 0.65 liter of water and an aqueous solution of 1,446 g of $CuSO_4 \cdot 5H_2O$ in 4.3 liters of water successively. After the evolution of carbon dioxide ceased, an aqueous solution of 463 g NaOH in 2.1 liters of water was added thereto and the resulting precipitate was washed 3 times with 6 liters of water, dried at 120°C overnight, pulverized and calcined at 450°C for 3 hours. Yield; 533 g. The product will be referred to as catalyst A.

A silica-alumina $Al_2O_3/SiO_2$ (molar ratio 1/0.112) was calcined at 1,000°C and pulverized to obtain catalyst B.

200 g of $CrO_3$ were added to 200 g of water and an aqueous solution of 318 g of oxalic acid in 750 g of water was added thereto. After the reaction at 50°C for 1 hour, a reduced chromium gel solution is obtained, whhich will be referred to as binder C.

100 g of the catalyst A, 100 g of the catalyst B and 44 g of the binder C were kneaded together and shaped into pills of a diameter of 1 mm by a pill-making machine. The pills were dried with air overnight and calcined at 450°C for 3 hours. 15 g of the thus obtained catalyst mixture were charged in a reaction tube having 10 mm inside diameter and the temperature of the catalyst mixture was elevated to 170°C while 0.5 kg/cm² of $N_2$ gas was passed at a rate of 33 liters/hr. Thereafter, 1 liter/hr. of $H_2$ gas was incorporated in said $N_2$ gas and the mixed $N_2$-$H_2$ gas was introduced therein at a rate of 34 liters/hr. for 100 minutes while the temperature was raised gradually to 250°C. Further, $H_2$ alone was introduced therein at a rate of 66 liters/hr. for 1 hour to reduce the catalyst.

The reaction tube containing the catalyst was kept at 245°C and a gas mixture of hydrogen and maleic anhydride having a hydrogen pressure of 35 kg/cm² and a maleic anhydride pressure of 120 mm Hg (absolute pressure) was passed over the catalyst, the average residence time being 5.3 seconds. The tetrahydrofuran content of the product was 99.2 wt. %, the impurity content being only 0.8 %.

For comparison, the same procedure as in Example 1 was repeated except that the calcining temperature in the preparation of the catalyst B was made 700°C. The tetrahydrofuran content of the product was 96 %.

Further, the same procedure as in Example 1 was repeated except that the reaction temperature was raised from 245° to 270°C and that the average residence time was reduced from 5.3 seconds to 2.2 seconds. The tetrahydrofuran content of the product was 98 %.

EXAMPLE 2

The same procedure as in Example 1 was repeated except that 100 g of the Cu-Cr-Zn catalyst A and 100 g of silica-alumina catalyst B were replaced with the following amounts of the respective catalysts to obtain the following results:

| Catalyst A (g) | Catalyst B (g) | Tetrahydrofuran content of the product (wt. %) |
|---|---|---|
| 60 | 140 | 98.2 |
| 160 | 40 | 98.0 |

The embodiments of the invention in which an exclusive property or privilege is claimed are defined as follows:

1. In a process for the production of tetrahydrofuran by catalytically hydrogenating and dehydrating maleic anhydride, in the gas phase, at a temperature of 200° to 300°C, under a pressure of 10 to 50 kg/cm², employing a molar ratio of hydrogen: maleic anhydride of from 10 : 1 to 200 : 1, the improvement which comprises: employing as the catalyst in the reaction a metal oxide catalyst composition consisting essentially of a mixture of (A) a catalyst component obtained by calcining at from 950° to 1,150°C a silica-alumina catalyst having a silica:alumina molar ratio of 0.03 to 0.5 : 1 and (B) a copper-chromium-zinc catalyst component, wherein the amount of said copper-chromium-zinc catalyst component in the mixture is 30 to 80 wt. %.

2. The process according to claim 1, in which the molar ratio of Cu : Cr : Zn in said copper-chhromium-zinc catalyst component (B) is 1 : 0.6–0.8 : 0.3–0.5.

3. The process according to claim 1, in which said copper-chromium-zinc catalyst component is obtained by dissolving 1 mole of $CuSO_4$, 0.6 to 0.8 mole of $CrO_3$ and 0.3 to 0.5 mole of $ZnSO_4$ in an aqueous solution, adding sodium hydroxide to effect precipitation, washing the precipitate with water, and drying and calcining the precipitate.

* * * * *